(12) United States Patent
O'Hara

(10) Patent No.: US 9,671,209 B2
(45) Date of Patent: Jun. 6, 2017

(54) TOOL FOR ESTABLISHING THE LENGTH OF SPECIFIC THICKNESS STOCK REQUIRED TO FORM AN ENCLOSED SHAPE HAVING PREDETERMINED DIMENSIONS

(71) Applicant: Marilyn J. O'Hara, Plano, TX (US)

(72) Inventor: Marilyn J. O'Hara, Plano, TX (US)

( * ) Notice: Subject to any disclaimer, the term of this patent is extended or adjusted under 35 U.S.C. 154(b) by 21 days.

(21) Appl. No.: 14/858,696

(22) Filed: Sep. 18, 2015

(65) Prior Publication Data
US 2017/0082415 A1    Mar. 23, 2017

(51) Int. Cl.
*G01B 3/34*    (2006.01)
*G01B 5/02*    (2006.01)
*G01B 5/12*    (2006.01)

(52) U.S. Cl.
CPC ............. *G01B 3/34* (2013.01); *G01B 5/02* (2013.01); *G01B 5/025* (2013.01); *G01B 5/12* (2013.01)

(58) Field of Classification Search
CPC ... G01B 3/34; G01B 3/46; G01B 3/50; G01B 5/12; G01B 5/025; G01B 5/02; A44C 27/00
See application file for complete search history.

(56) References Cited

U.S. PATENT DOCUMENTS

| 190,933 | A | * | 5/1877 | Underwood | ............. | G01B 3/34 33/514.1 |
|---|---|---|---|---|---|---|
| 458,564 | A | | 9/1891 | Engel | | |
| 800,696 | A | | 10/1905 | Wagner | | |
| 987,703 | A | * | 3/1911 | Curtin | ....................... | G01B 3/30 33/199 R |
| 1,282,772 | A | | 10/1918 | Dinhofer | | |
| 4,490,921 | A | | 1/1985 | Woods et al. | | |
| 4,875,296 | A | | 10/1989 | Holzmeister et al. | | |
| 4,964,222 | A | | 10/1990 | Keener | | |

(Continued)

OTHER PUBLICATIONS

Shank Size Template; webpage http://www.nancylthamilton.com/resources/tools/ring-bracelet-and-bezel-mandrels/; Oct. 18, 2014.*

(Continued)

*Primary Examiner* — Daniel J Colilla
(74) *Attorney, Agent, or Firm* — Hubbard Johnston, PLLC

(57) ABSTRACT

A physical measuring tool comprising one or more members for determining the correct length of stock of various shapes of a given thickness and width range required to form various enclosed shapes with predetermined internal dimensions. One embodiment is an easy to use enclosed shape measuring tool that allows jewelers to fabricate rings of various widths from stock with great precision and fit without costly revision, as the measurements it makes are calibrated to the proportional relation among the thickness, length, width of material, and finished fit of ring. Each measuring element includes a raised fence for bracing material against to maximize measurement accuracy, and other convenient elements such as a thickness-measuring member. Such a tool replaces mathematical calculations and charts for determining the ratio among length and thickness of stock, and width and interior dimensions of enclosed shapes representing a significant time and resource saver for fabricators.

16 Claims, 11 Drawing Sheets

(56) References Cited

U.S. PATENT DOCUMENTS

| | | | | |
|---|---|---|---|---|
| 5,016,509 A * | 5/1991 | Stottman | ............... | B27B 25/10 |
| | | | | 294/15 |
| 5,353,513 A | 10/1994 | Round | | |
| 7,181,858 B2 | 2/2007 | Haug | | |
| 7,322,119 B2 | 1/2008 | Haug | | |
| 2004/0200084 A1 * | 10/2004 | Wang | ............... | G01B 3/50 |
| | | | | 33/501.45 |

OTHER PUBLICATIONS

Ring Blank Lengths Chart; Gesswein, The Right Tools; Oct. 2, 2013.*
Professional Jewelry Making; Alan Revere, pp. 332-333; Oct. 1, 2011.*
Untracht, Oppi. Jewelry Concepts and Technology. Garden City, N.Y.: Doubleday, 1982. p. 734-43. Print.

* cited by examiner

Blank width of 0-4mm

| | Inside Circumference | 10GA. | 12GA. | 14GA. | 16GA. | 18GA. | 20GA. | 22GA. | 24GA. |
|---|---|---|---|---|---|---|---|---|---|
| 1 | 39.1 | 47.09 | 45.29 | 44.09 | 43.09 | 42.09 | 41.49 | 40.89 | 40.59 |
| 1.5 | 40.4 | 48.34 | 46.57 | 45.37 | 44.37 | 43.37 | 42.77 | 42.17 | 41.87 |
| 2 | 41.7 | 49.60 | 47.84 | 46.64 | 45.64 | 44.64 | 44.04 | 43.44 | 43.14 |
| 2.5 | 42.9 | 50.86 | 49.12 | 47.92 | 46.92 | 45.92 | 45.32 | 44.72 | 44.42 |
| 3 | 44.2 | 52.11 | 50.40 | 49.20 | 48.20 | 47.20 | 46.60 | 46.00 | 45.70 |
| 3.5 | 45.5 | 53.37 | 51.47 | 50.47 | 49.47 | 48.47 | 47.87 | 47.27 | 46.97 |
| 4 | 46.8 | 54.63 | 52.95 | 51.75 | 50.75 | 49.75 | 49.15 | 48.55 | 48.25 |
| 4.5 | 48 | 55.88 | 54.23 | 53.03 | 52.03 | 51.03 | 50.43 | 49.83 | 49.53 |
| 5 | 49.3 | 57.14 | 55.60 | 54.30 | 53.30 | 52.30 | 51.70 | 51.10 | 50.80 |
| 5.5 | 50.6 | 58.40 | 56.78 | 55.58 | 54.58 | 53.58 | 52.98 | 52.38 | 52.08 |
| 6 | 51.9 | 59.65 | 58.06 | 56.86 | 55.86 | 54.86 | 54.26 | 53.66 | 53.36 |
| 6.5 | 53.1 | 60.91 | 59.33 | 58.13 | 57.13 | 56.13 | 55.53 | 54.93 | 54.63 |
| 7 | 54.4 | 62.17 | 60.61 | 59.41 | 58.41 | 57.41 | 56.81 | 56.21 | 55.91 |
| 7.5 | 55.7 | 63.42 | 61.89 | 60.69 | 59.69 | 58.69 | 58.09 | 57.49 | 57.19 |
| 8 | 57 | 64.68 | 63.16 | 61.96 | 60.96 | 59.96 | 59.36 | 58.76 | 58.46 |
| 8.5 | 58.3 | 65.94 | 64.44 | 63.24 | 62.24 | 61.24 | 60.64 | 60.04 | 59.74 |
| 9 | 59.5 | 67.19 | 65.72 | 64.52 | 63.52 | 62.52 | 61.92 | 61.32 | 61.02 |
| 9.5 | 60.8 | 68.45 | 66.99 | 65.79 | 64.79 | 63.79 | 63.19 | 62.59 | 62.29 |
| 10 | 62.1 | 69.71 | 68.27 | 67.07 | 66.07 | 65.07 | 64.47 | 63.87 | 63.57 |
| 10.5 | 63.4 | 70.96 | 69.55 | 68.35 | 67.35 | 66.35 | 65.75 | 56.15 | 64.85 |
| 11 | 64.6 | 72.22 | 70.83 | 69.63 | 68.63 | 67.63 | 67.03 | 66.43 | 66.13 |
| 11.5 | 65.9 | 73.48 | 72.10 | 70.90 | 69.90 | 68.90 | 68.30 | 67.70 | 67.40 |
| 12 | 67.2 | 74.73 | 73.38 | 72.18 | 71.18 | 70.18 | 69.58 | 68.98 | 68.68 |
| 12.5 | 68.5 | 75.99 | 74.66 | 73.46 | 72.46 | 71.46 | 70.86 | 70.26 | 69.96 |
| 13 | 69.7 | 77.25 | 75.93 | 74.73 | 73.73 | 72.73 | 72.13 | 71.53 | 71.23 |
| 13.5 | 71 | 78.50 | 77.21 | 76.01 | 75.01 | 74.01 | 73.41 | 72.81 | 72.51 |
| 14 | 72.3 | 79.76 | 78.49 | 77.29 | 76.29 | 75.29 | 74.69 | 74.09 | 73.79 |
| 14.5 | 73.6 | 81.02 | 79.76 | 78.56 | 77.56 | 76.56 | 75.96 | 75.36 | 75.06 |
| 15 | 74.8 | 82.27 | 81.04 | 79.84 | 78.84 | 77.84 | 77.24 | 76.64 | 76.34 |

Fig. 3

TOOL FOR ESTABLISHING THE LENGTH OF SPECIFIC THICKNESS STOCK REQUIRED TO FORM AN ENCLOSED SHAPE HAVING PREDETERMINED DIMENSIONS

CROSS-REFERENCE TO RELATED APPLICATIONS

Not Applicable

FEDERALLY-SPONSORED RESEARCH

Not Applicable

FIELD

Measuring tool for determining length of stock of a given thickness and width to form an enclosed shape of specified internal dimensions or diameter

BACKGROUND

Prior Art

The following is a tabulation of some prior art that presently appears relevant:

| U.S. Patents | | | |
|---|---|---|---|
| Pat. No. | Class | Issue Date | Patentee |
| 458,564 | 33/514.1 | Sep. 1, 1891 | Engel |
| 800,696 | 33/514.2 | Oct. 3, 1905 | Wagner |
| 1,282,772 | 33/514.1 | Oct. 29, 1918 | Dinhofer |
| 4,490,921 | 33/476 | Sep. 13, 1982 | Woods et al. |
| 4,875,296 | 33/770 | Oct. 24, 1989 | Holzmeister et al. |
| 4,964,222 | 33/544.4 | Oct. 23, 1990 | Keener |
| 5,353,513 | 33/555.2; 33/514.1 | Oct. 11, 1994 | Round |
| 7,181,858 | 33/544.4 | Feb. 27, 2007 | Haug |
| 7,322,119 B2 | 33/544.4 | Jan. 29, 2008 | Haug |

| Nonpatent Literature Documents |
|---|
| Untracht, Oppi. *Jewelry Concepts and Technology.* Garden City, N.Y: Doubleday, 1982. 734-43. Print. |

BACKGROUND

Fabricating enclosed shapes of multiple widths (from narrow bands to longer tubes) from stock of various shapes such as flat, round, triangular, square, domed etc. of a particular thickness, to achieve a specific internal dimension, diameter, or particular ring fit, is a crucial task for many metal smiths and other fabricators. For instance, consider the case of jewelers who fabricate various enclosed shapes such as rings and bezels from stock. If an enclosed shape of an incorrect internal diameter results from forming an enclosed shape out of a length of stock, then rectifying this mistake is a time and resource intensive process, thus increasing fabrication time and costs.

Given the variability in thicknesses of material, determining the appropriate length of stock required to form an enclosed shape such as a ring with a specific internal diameter, or particular fit, is a complex problem, one which is currently solved through mathematical calculations, charts, guesswork or some combination of these approaches. One sphere in which this problem is particularly vivid is that of jewelers and metal smiths, who fabricate items with variable widths and close tolerances such as rings and bezels for setting stones. The correct sizing of a ring is crucial for comfortable wearing of such an item. Currently, for jewelers fabricating rings out of various types of flat or wire metal stock, they generally rely on a paper chart (size table) to determine the length of stock required for a ring of a specific size (internal diameter). One axis of the size table will indicate specific ring sizes, another axis particular gauges or thicknesses of metal. However this method is inadequate for two reasons Firstly, the width of the finished ring affects the internal diameter required to achieve the desired fit of the ring. Secondly, such tables are hard to use, as they do not directly interact with the material to be measured. This second difficulty with the table method can be illustrated with those learning the craft of metal fabrication, a significant subset of users of such tables. Many beginning jewelers and metal smiths are unaware of the correct way to measure stock using a ruler. Further complicating the issue is the fact that stock measurements for specific ring sizes are expressed in millimeters, which is necessary due to the small sizes at work. However in the US, many individuals, including many beginning jewelers and metal smiths are unfamiliar with this unit of measurement, further complicating the use of a table. A final difficulty is that reading the table itself can be confusing. Such tables are densely packed rows and columns of numbers that are only fractionally different in certain cases, and it is easy to mistake one size for another. The practical difficulties that such problems cause can be highlighted by noting that there is very little tolerance in the ratio between length of stock and ring size when you work on a small scale, and even minor variations in measurement can result in significant shifts in the internal diameter and fit of the ring.

There is another type of printed chart that suffers from different difficulties. These printed charts contain depictions of the dimensions of the length of stock required to form an enclosed shape with a specific internal diameter. These depictions are in the form of various printed rulers for various gauges or thicknesses of stock, or sometime rectangles with size indications. Such depictions also contain an inherent flaw, which is that printing such charts can alter the dimensions of the forms on the chart (scaling issues), thus making accurate measurement impossible. In addition to the difficulty of scaling issues, depiction charts, like tables, do not directly interact with the stock to be fabricated thus not directly aiding the measuring process.

Once an enclosed shape such as a ring has been formed, the accepted method for determining the size or internal diameter of a ring is to place it on a mandrel. A mandrel is a gradually tapered cone of metal with a determinate shape in cross section used to measure or form enclosed shapes. Ring mandrels are typically round, ovoid, or other close variations, and are either forming mandrels with smooth surfaces and may or may not have markings, or measuring mandrels that have ring sizes or internal diameter measurements noted down one side. You measure the internal dimensions or size of an enclosed shape such as a ring by sliding it onto the mandrel and noting the size at the point that it reached. Thus you cannot accurately measure the size or internal diameter of the ring until it has been joined and shaped, a join that it will take significant time and resource to rectify if your initial size is incorrect. If your initial ring is too small, and if the difference is minor, you may be able to stretch it, but this is likely to mar the metal requiring greater effort in finishing. Otherwise it must be cut open, and more material added (by mathematical calculations, charts, guesswork or some combination of these approaches), and the ring re-soldered, creating a ring with two seams rather than one, both compromising the integrity of the ring and increasing finishing time. If the ring is too large, then it must be cut open, excess material removed (again by mathematical calculations, charts, guesswork or some combination of these approaches), and re-soldered, again requiring extra finishing. Moreover if the first rectification does not work, then this may happen again. Note that this problem will occur no matter what type of enclosed shape is formed through taking a length of stock, joining it into an enclosed shape, and then forming it over an appropriately shaped mandrel. For instance bezels and other components that come in a wide variety of enclosed shapes including squares, octagons, triangles, rectangles etc. These types of mistakes add substantial time and production cost to the fabrication process, while possibly compromising the look and integrity of the finished product.

In short the problem is that there are in fact three variables that determine the internal diameter and particular fit of an enclosed shape such as a ring. These variables are: (1) the length of the stock; (2) the thickness (gauge) of the stock; and (3) the width of the proposed enclosed shape. Fingers are not of a uniform diameter down the length of a finger, so a wide ring, which covers more of the finger, will fit differently to a narrow ring, which is only concerned with the diameter of the finger at a specific point. Consequently, a wide ring and a narrow ring of the same size will require different lengths of stock of the same gauge to form. This variability is not taken into account with the current methods of providing length to gauge (thickness) ratios. A further inconvenience is generated by the fact that most metal smiths work in multiple thicknesses (gauges) of metal, where differences in the thickness of the stock is so small as to be difficult to perceive by eye, but still significantly affects the internal diameter of the finished enclosed shape. This means that mistaking one gauge of metal for another can further complicate the fabrication process.

SUMMARY

In accordance with one embodiment a measuring tool comprising a plurality of measuring members including (a) length measuring arms that have a measuring scale based on the ratio between a specific length and thickness of stock of various shapes such as flat, round, triangular, square, domed etc., and the width and internal dimensions of an enclosed shape formed from such a piece of stock, (b) a raised fence on the surface of the length measuring arm where the measurements taken using the arm are calibrated to originate, (c) a recessed area to facilitate the precision of measurements made using such length measuring arms, (d) other measuring members such as a thickness gauge for determining the thickness of a piece of stock, and (e) an enclosure joined to the measuring members on a pivot joint along a rotational axis.

Advantages

A physical tool that provides a tangible, fast, accurate, and easy to use way to determine and measure the length of stock required for a particular ring size and fit in a given width represents a significant time and resource saver for metal smiths. The amount of time and resources saved by fabricating rings of an accurate internal diameter and size for a given ring width the first time is significant, and is a valuable benefit for metal smiths, both beginner and advanced. Such a tool can additionally include various other convenient pre-existing measuring elements in a new combination such as a way to accurately measure the gauge or thickness of the metal, contributing to the accuracy and efficiency of the work of metal smiths, jewelers and others who must fabricate enclosed shapes, rings or tubes from various thickness or gauges of metal to exacting specifications.

FIGURES

FIG. 3 depicts an embodiment of a ratio table that encodes the length of stock for a given thickness or gauge of stock to produce a ring of a standardized size, in a specified width range.

DETAILED DESCRIPTION

Figure 1:
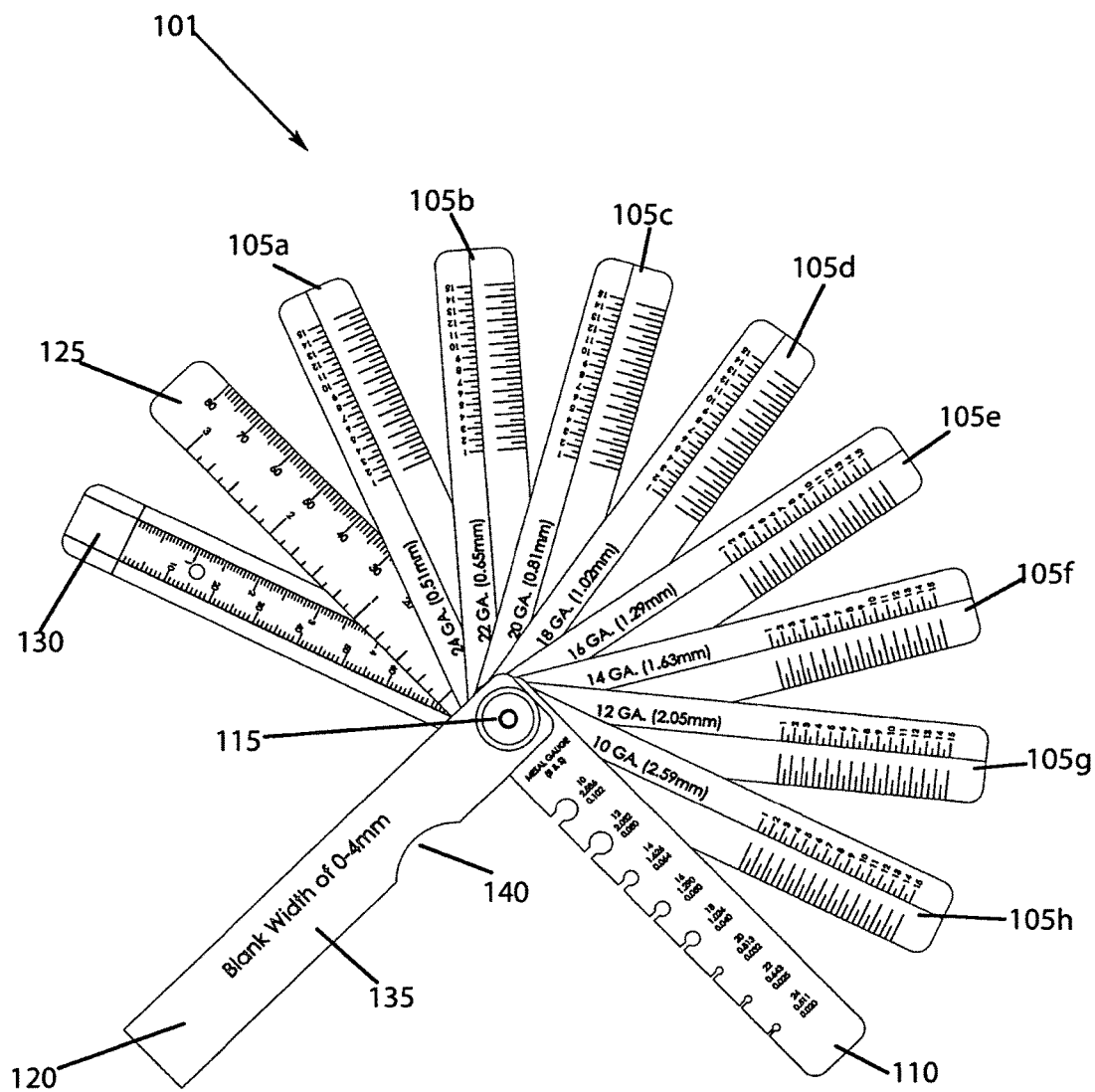
FIG. 1 depicts an embodiment of an enclosed shape measuring tool for determining the length of stock of a given thickness or gauge and width required to form an enclosed shape, ring or tube of specific internal dimensions and/or fit.

One embodiment of enclosed shape measuring tool version A 101 for determining the length of stock of various shapes such as flat, round, triangular, square, domed etc. of a particular thickness of a given thickness or gauge and width required to form an enclosed shape, ring or tube of a specified internal diameter and/or fit is illustrated in FIG. 1. The tool has a plurality of arms, blades, or leaves such as length measuring arms version A 105a-h, gauge measuring arm version A 110, ruler version A 125, sliding millimeter gauge arm version A 130, that fan out from pivot joint version A 115. The arms that comprise the elements of enclosed shape measuring tool version A 101 fold into a stack that is contained within enclosure version A 120. Enclosure version A 120 covers the measuring edges of elements of enclosed shape measuring tool version A 101 such as length measuring arms version A 105a-h, gauge measuring arm version A 110, ruler version A 125 and sliding millimeter gauge arm version A 130. Grip recess version A 140 in the edge of enclosure version A 120 allows the enclosed elements to be grasped and pivoted out of enclosure version A 120 along a rotational axis. Pivot joint version A 115 connects enclosure version A 120 to length measuring arms version A 105a-h, gauge measuring arm version A 110, ruler version A 125 and sliding millimeter gauge arm version A 130 along a rotational axis. There are multiple length measuring arms version A 105a-h. Each length measuring arm version A 105a-h is imprinted with a specific gauge or thickness. Every length measuring arm version A 105a-h is imprinted with a precise scale indicated in units of length, size or some other scale calibrated to target internal diameters that will result from forming an enclosed shape from stock that is a set number of units in length. Thickness or gauge measuring arm version A 110 comprises of a rectangular arm with precisely machined cutouts, slots or arbors along one side, each of which corresponds to a specific thickness or gauge of stock. Each cutout on gauge measuring arm version A 110 is clearly marked with the precise gauge or thickness of stock that the cutout size corresponds to. Ruler arm version A 125 is imprinted with a fine-grained measuring scale. Sliding millimeter gauge arm version A 130 is marked with a precise and fine-grained measuring scale that indicates thicknesses that fall on and between standard measures of stock thickness such as the Brown & Sharp Metal Gauge measures (B&S), American Standard Gauge measures, or other measuring standards. Each set or subset of elements of enclosed shape measuring tool is marked with the width of finished enclosed shapes that they are calibrated for via width mark version A 135. Different embodiments of enclosed shape measuring tool can include some or all of these innovative and prior art elements such as ruler arm version A 125 and millimeter gauge arm version A 130 in varying novel combinations.

Figure 2:
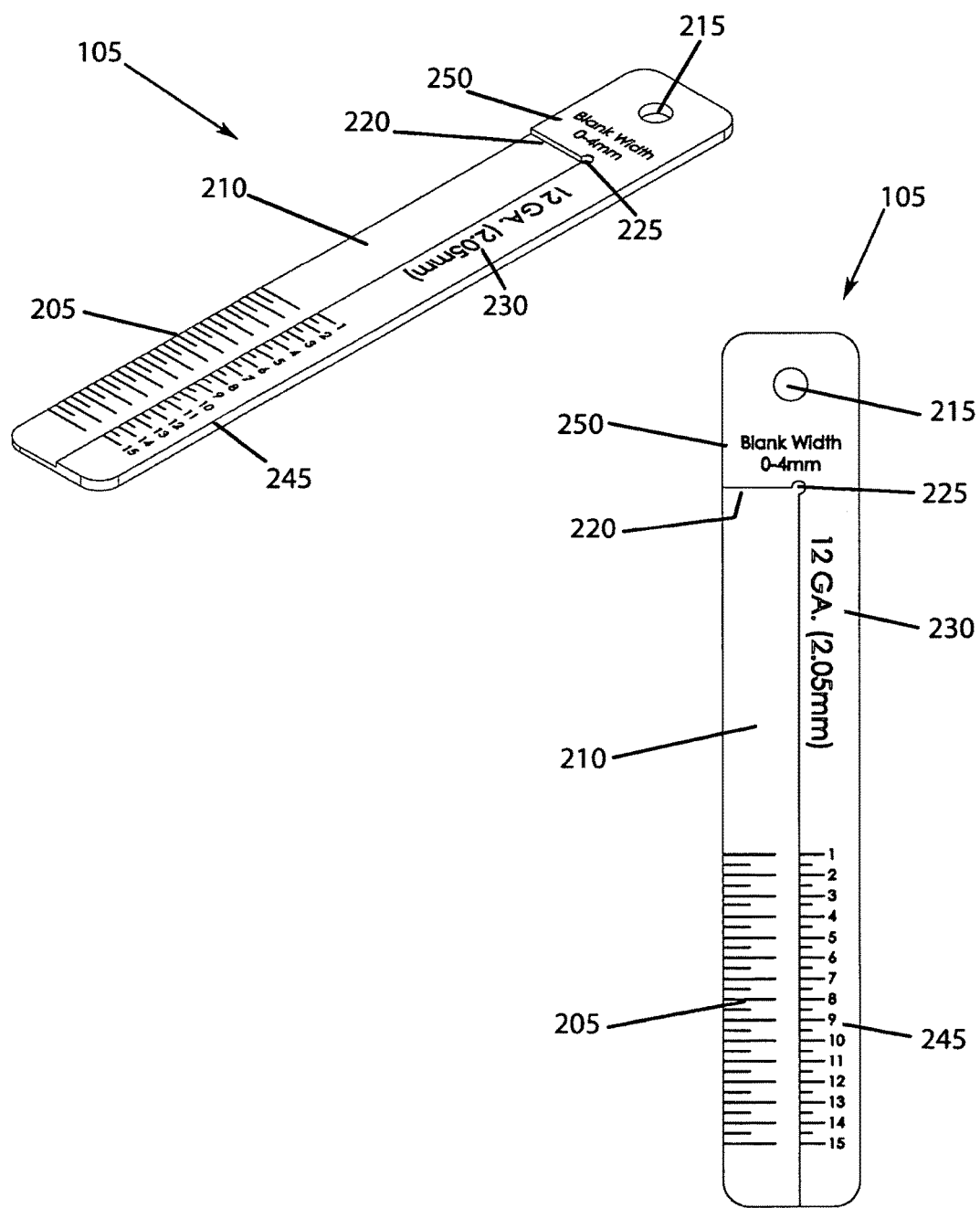
FIG. 2 depicts an embodiment of a measuring arm of a tool for determining the length of stock of a given thickness or gauge and width required to form an enclosed shape, ring or tube of a specified internal diameter and/or fit that determines required length of stock for the given gauge and width of stock.

FIG. 2 depicts an embodiment of length measuring arm version A 105. Each length measuring arm version A 105 is calibrated to match a specific range of thicknesses or gauges of stock, and a specific range of widths of stock. Gauge mark version A 230 indicates the thickness (or range of thicknesses) of stock that length measuring arm version A 105 is calibrated for. Width mark version A 250 indicates the range of finished widths that length measuring arm version A 105 is calibrated for. Pivot joint attachment hole version A 215 allows length measuring arm version A 105 to be attached to other elements of enclosed shape measuring tool version A 101, and to enclosure version A 120. Precision measuring scale version A 205 is a clearly marked scale imprinted, engraved, printed or otherwise indicated on length measuring arm version A 105. Rectangular recess version A 210 is a flat bed of lower height than the rest of length measuring arm version A 105. Rectangular recess version A 210 runs parallel to measuring ledge version A 240. Size markings version A 245 are adjacent to precision measuring scale version A 205 and are imprinted on length measuring arm version A 105 to indicate the precise size that will be achieved by forming an enclosed shape using stock of a given length. The border of the long edge of rectangular recess version A 210 is measuring ledge version A 240. Measuring ledge version A 240 is a precisely machined straight line that forms the border between rectangular recess version A 210 and the raised portion of length measuring arm version A 105. Apse version A 225 is a semi-circular recess at the interior junction of the short edge and long edge of rectangular recess version A 210. Fence version A 220 is a precisely machined straight line that forms the short edge at the border between rectangular recess version A 210 and raised portions of length measuring arm version A 105, that is located at the determinate point that precision measuring scale version A 205 is calibrate to originate from.

FIG. 3 depicts an embodiment of ratio table 301 that encodes the ratios between lengths of stock, thicknesses of stock, and various internal dimensions of formed enclosed shapes for a given range of widths of finished enclosed shape. The width range that ratio table 301 is calibrated for is indicated by width mark 305. The ratios represented in ratio table 301 represent the proportional relations amongst lengths; thickness, widths and internal dimensions that the precision measuring scales that occur on various embodiments of the tool may be based upon, such as precision measuring scale version A 205. Each column on ratio table 301 correspond to an instance of measuring arm version A 105 and its precision measuring scale version A 205 for a given thickness and width of stock. Ratio table 301 depicts values that are calibrated to produce standardized ring sizes for finished rings from 0 mm to 4 mm wide. A separate such chart is required for various ranges of widths of ring or tube, to ensure the precision of the finished fabrication.

Figure 4:
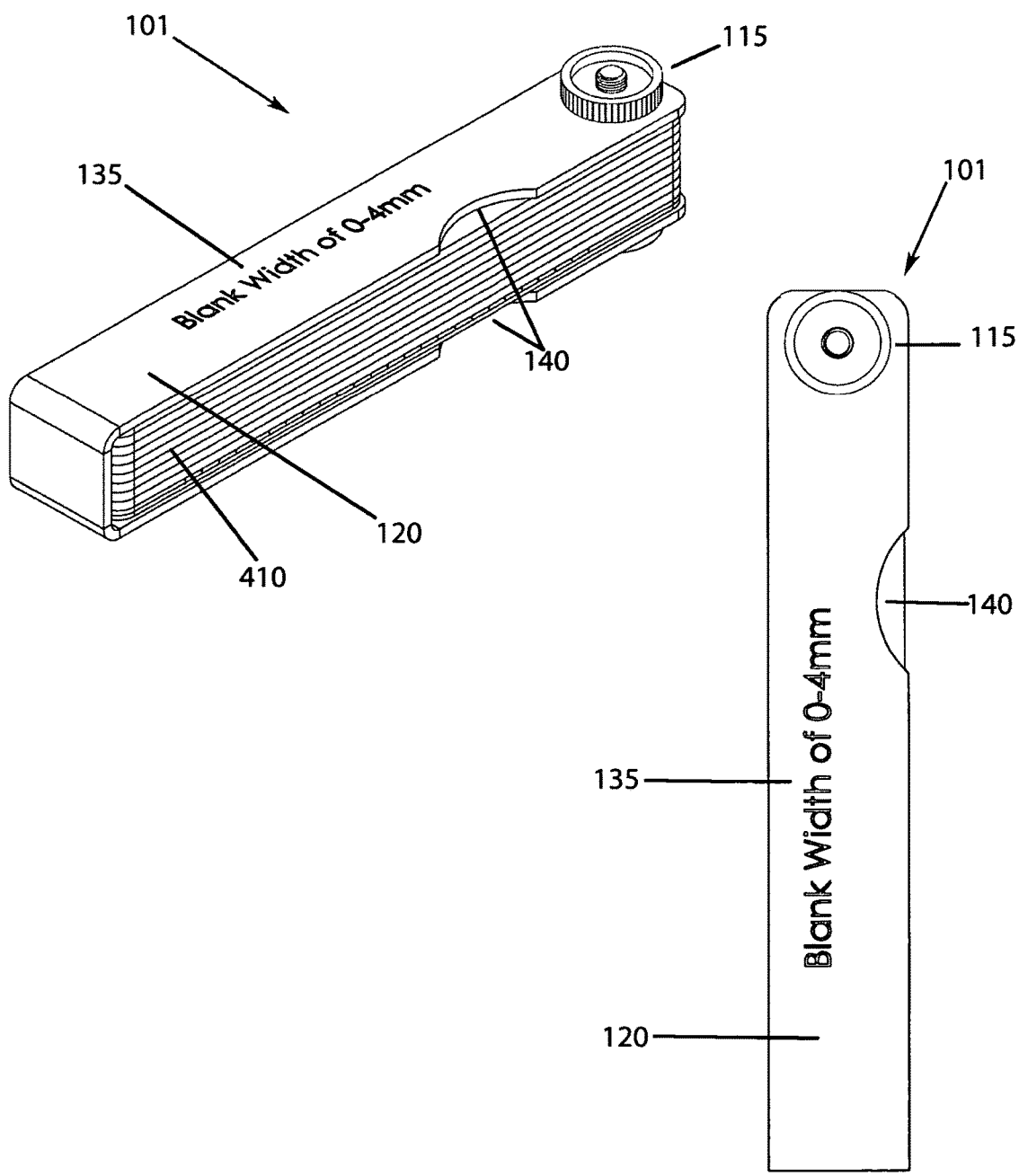
FIG. 4 depicts an embodiment of an enclosure to protect the integrity of the measuring elements of a tool for determining the length of stock of a given gauge and width required to form an enclosed shape, ring or tube of a specified internal diameter and/or fit.

FIG. 4 depicts the exterior of enclosure version A 120 of enclosed shape measuring tool version A 101. All elements of enclosed shape measuring tool version A 101 fold inside enclosure version A 120. Enclosure version A 120 protects the element edges 410 from damage. Pivot joint hole version A 215 allows enclosure version A 120 to be connected to the elements of enclosed shape measuring tool version A 101 via pivot joint version A 115. Width mark version A 135 indicates the range of widths of stock that a particular embodiment of enclosed shape measuring tool version A 101 within an enclosure version A 120 is calibrated for. Grip recess version A 140 in the edge of enclosure version A 120 allows the enclosed elements to be grasped and pivoted out of enclosure version A 120 along a rotational axis.

Figure 5:
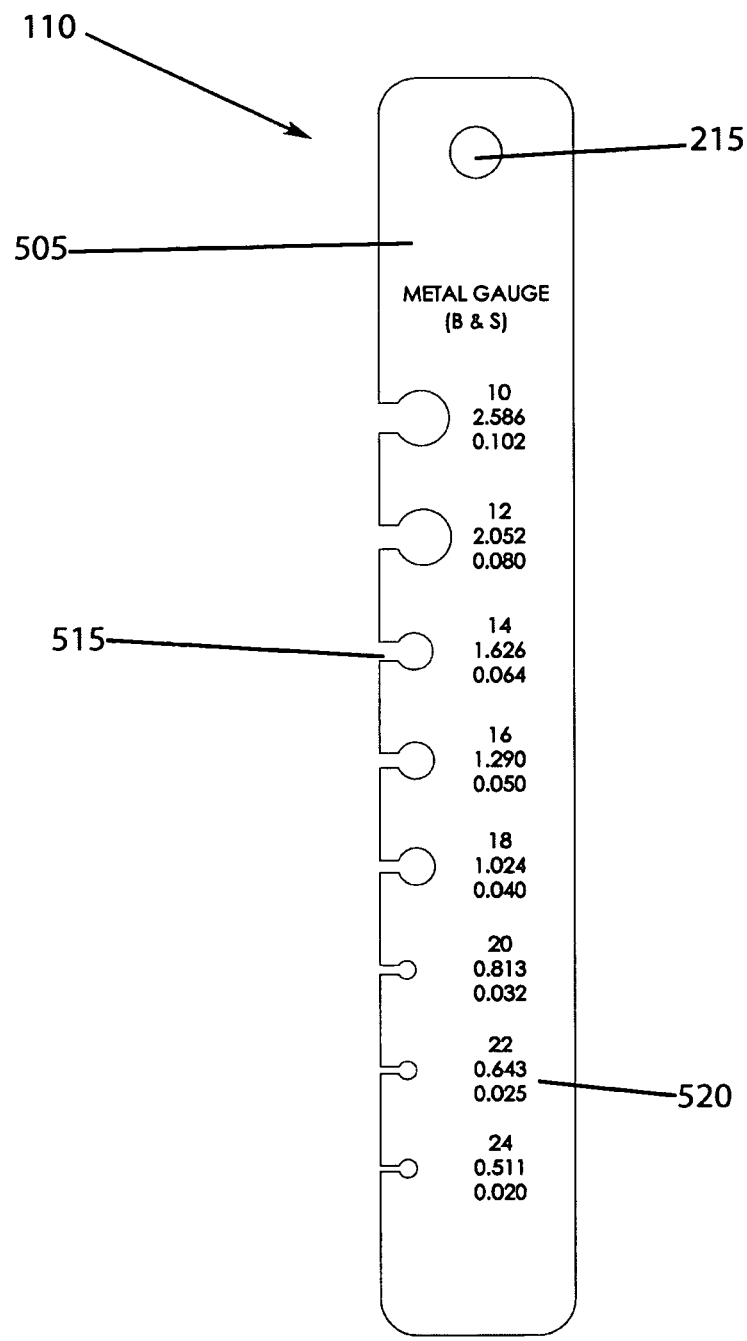
FIG. 5 depicts an embodiment of a component for determining the thickness or gauge of stock.

FIG. 5 depicts an embodiment of gauge measuring arm version A 110. Gauge measuring arm version A 110 comprises an arm or leaf of the same dimensions as length measuring arms version A 105a-h, with precisely machined arbors 515 being excised from one or both long edges. Each of the precisely machined arbors 515 corresponds to a specific thickness or gauges of stock. The standardized gauge scale that arbors 515 are calibrated for is indicated on gauge measuring arm version A 110 via scale mark 505. Each arbor 515 on gauge measuring arm version A 110 is clearly marked with the precise gauge or thickness of stock that the arbor size corresponds to via gauge mark 520 that are imprinted on gauge measuring arm version A 110. Gauge measuring arm version A 110 is connected to enclosed shape measuring tool version A 101 via pivot joint hole version A 215 that mates with pivot joint version A 115.

Figure 6:
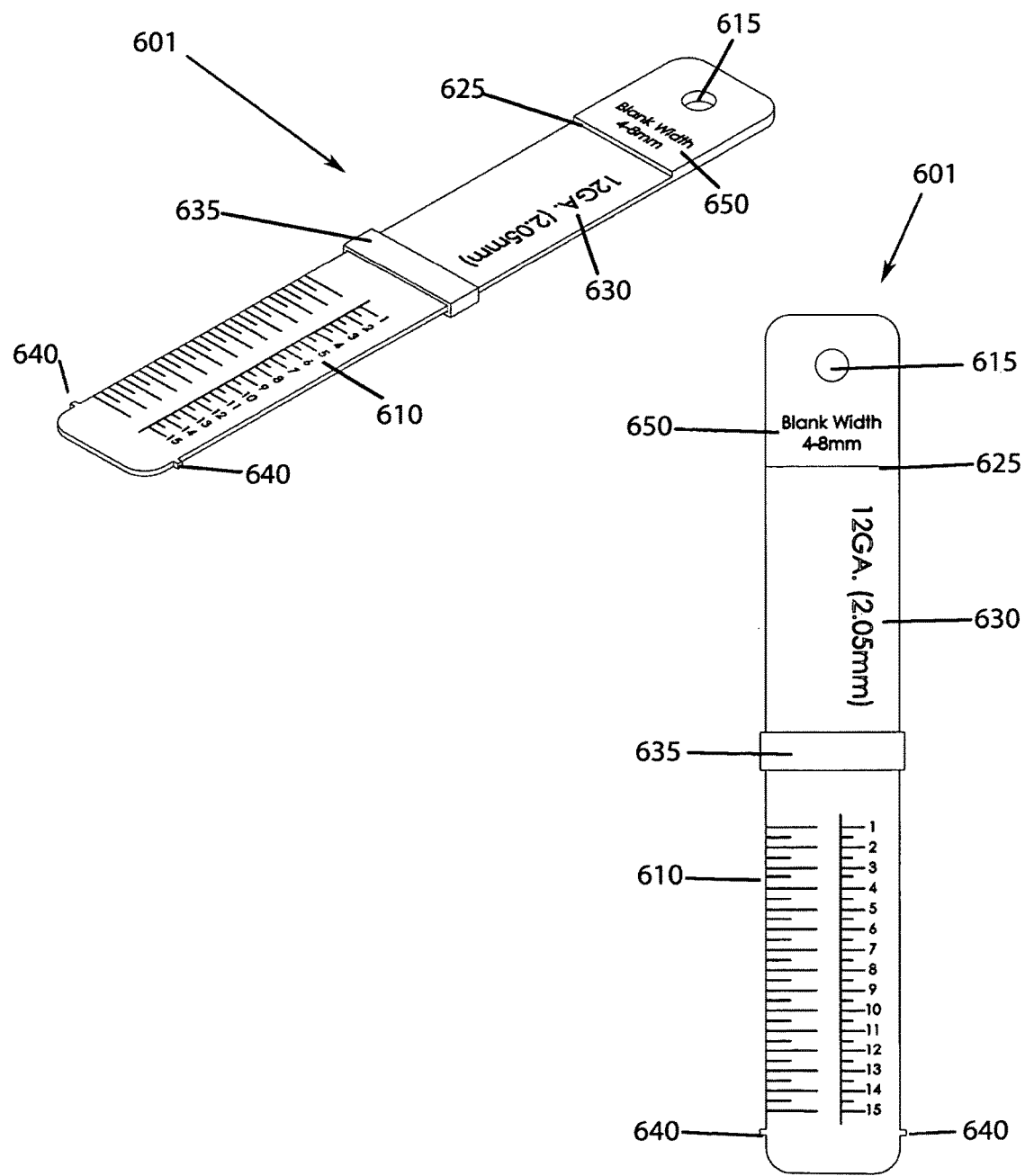
FIG. 6 depicts another embodiment of a measuring arm of a tool for determining the length of stock of a given thickness or gauge and width required to form an enclosed shape, ring or tube of a specified internal diameter and/or fit that determines required length of stock for the given gauge and width of stock.

FIG. 6 depicts a further embodiment of length measuring arm version A 105*a-h* measuring arm version B 601. Each measuring arm version B 601 is calibrated to match a specific range of thicknesses or gauges of stock, and a specific range of widths of stock. Gauge mark version B 630 indicates the thickness (or range of thicknesses) of stock that measuring arm version B 601 is calibrated for. Width mark version B 650 indicates the range of finished widths of enclosed shape that a particular measuring arm is calibrated for. Pivot joint attachment hole version B 615 allows measuring arm version B 601 to be attached to other elements of an embodiment of an enclosed shape measuring tool along a rotational axis. Precision measuring scale version B 610 is a clearly marked scale that could be imprinted, engraved, printed or otherwise indicated on measuring arm version B 601. Fence version B 625 is a raised bar or plane with a straight edge that extends across the width of measuring arm version B 601 perpendicular to precision measuring scale version B 610, that is located at the determinate point that precision measuring scale version B 610 is calibrate to originate from. Fence version B 625 is the point for the beginning of the measurement. Sliding stop 635 snuggly encircles measuring arm version B 601. Sliding stop 635 is prevented from sliding off the top end of measuring arm version B 601 by fence version B 625. Sliding stop 635 is prevented from sliding off the bottom end of measuring arm version B 601 by edge stops 640 that protrude from the sides of measuring arm version B 601. Sliding stop 635 is made of a hardwearing material with straight edges suitable for scribing a line against. The edge of stock to be measured is braced firmly against fence version B 625. By moving sliding stop 635 to the appropriate length measurement calibrated to the desired internal diameter, the straight edge of sliding stop 635 can be used to scribe a precise line on the stock at the appropriate length to ensure extremely precise measurements.

Figure 7:
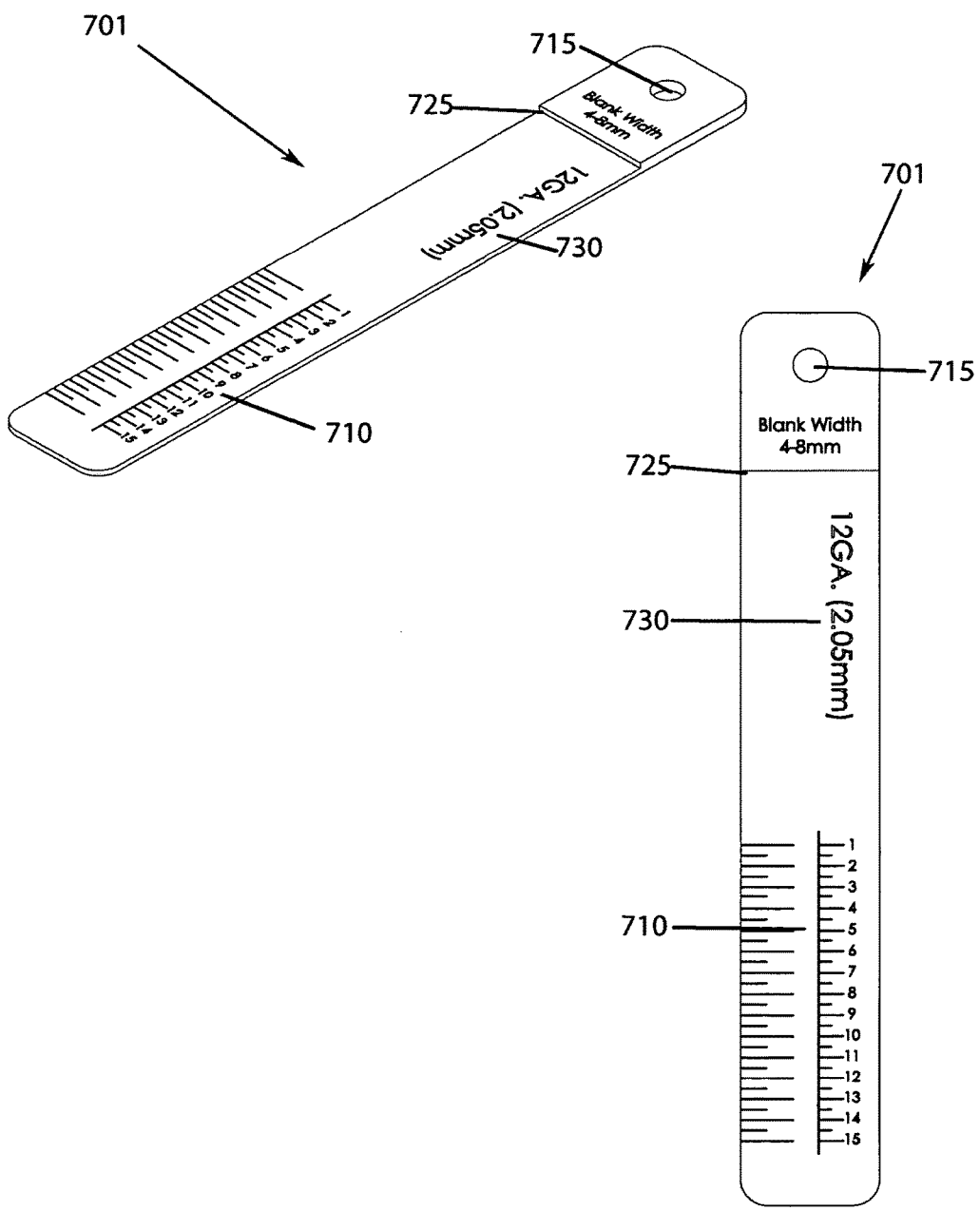
FIG. 7 depicts another embodiment of a measuring arm of a tool for determining the length of stock of a given thickness or gauge and width required to form an enclosed shape, ring or tube of a specified internal diameter and/or fit that determines required length of stock for the given gauge and width of stock.

FIG. 7 depicts a further embodiment of length measuring arm version A 105*a-h* length measuring arm version C 701. Each instance of length measuring arm version C 701 is clearly marked with the gauge or thickness of material that precision measuring scale version C 710 is calibrated for via gauge mark version C 730 imprinted on its surface. Width mark version C 750 is imprinted on top surface to indicate the range of widths of finished enclosed shape that a given length measuring arm version C 701 is calibrated for. Size markings indicated as part of precision measuring scale version C 710 indicate the precise size that will be achieved by forming an enclosed shape using stock of this particular length and within indicated width range. Pivot joint attachment hole version C 715 allows measuring arm version C 701 to be attached to other elements of enclosed shape measuring tool, and to enclosure version A 120 along a rotational axis. Fence version C 725 is a plane or narrow rectangular raised bar that is attached across the width of length measuring arm version C 701 adjacent and perpendicular to precision measuring scale version C 710. Fence version C 725 is the point for the beginning of the measurement. The user braces the stock of the appropriate gauge or thickness against fence version C 725, and marks the length appropriate to the desired finished interior dimensions according to precision measuring scale version C 710.

Figure 8:
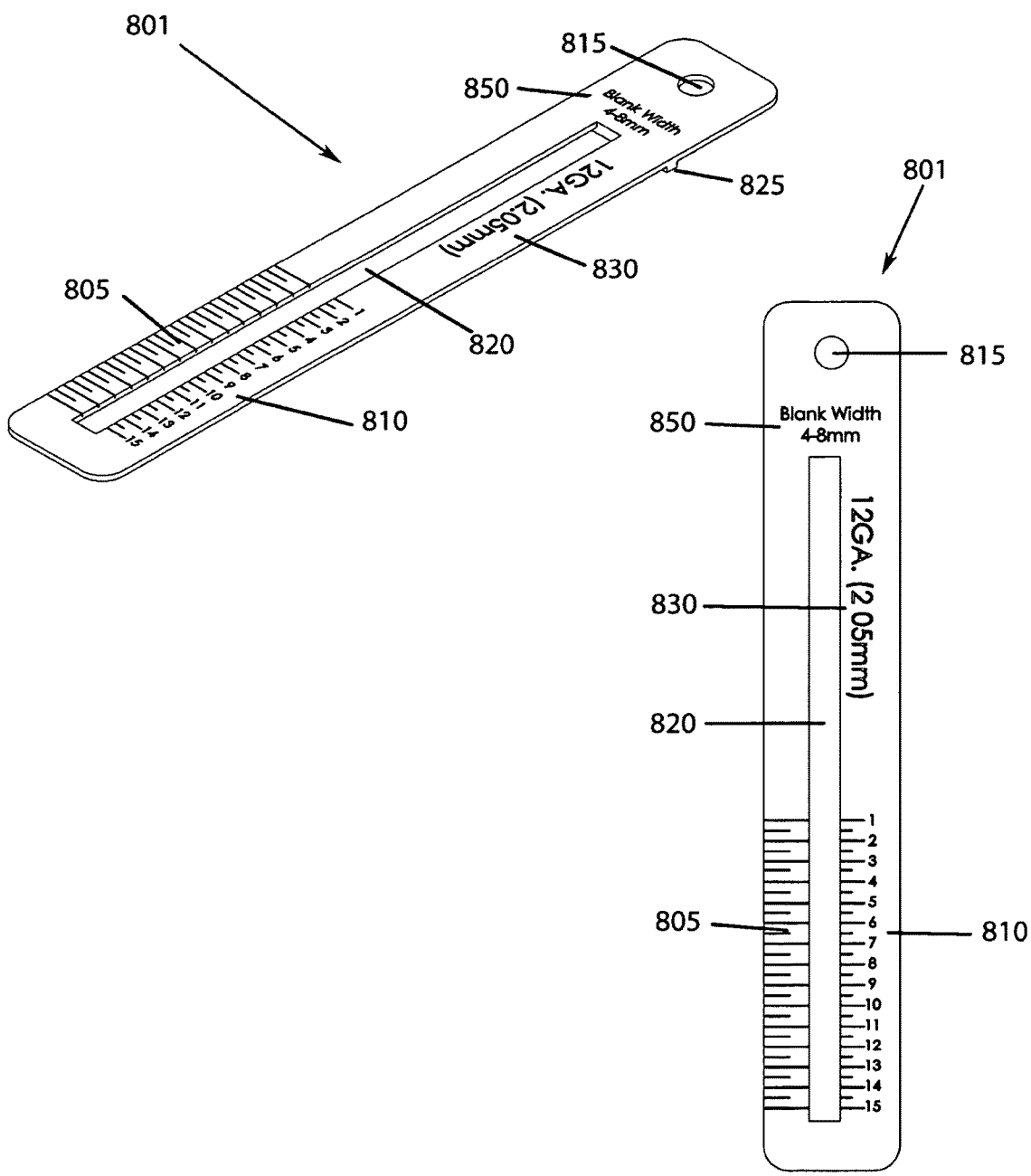
FIG. 8 depicts a further embodiment of a measuring arm of a tool for determining the length of stock of a given thickness or gauge and width required to form an enclosed shape, ring or tube of a specified internal diameter and/or fit that determines required length of stock for the given gauge and width of stock.

FIG. 8 depicts a further embodiment of length measuring arm version A 105*a-h* measuring arm version D 801. Each measuring arm version D 801 is calibrated to match a specific range of thicknesses or gauges of stock, and a specific range of widths of stock. Gauge mark version D 830 indicates the thickness (or range of thicknesses) of stock that measuring arm version D 801 is calibrated for. Width mark version D 850 indicates the range of finished widths of enclosed shape that a particular measuring arm is calibrated for. Pivot joint attachment hole version D 815 allows measuring arm version D 801 to be attached to other elements of an embodiment of an enclosed shape measuring tool along a rotational axis. There are two precision measuring scales imprinted on upper surface version D 835. Precision measuring scale A version D 805 is a clearly marked scale that could be imprinted, engraved, printed or otherwise indicated on measuring arm version D 801. Similarly precision measuring scale B version D 810 is a clearly marked scale that could be imprinted, engraved, printed or otherwise indicated on measuring arm version D 801. Each of these scales could variously represent whole and half sizes for ring, or various other distributed increments. These two precision measuring scales are imprinted on the long axis of measuring arm version D 801 on either side of cutout version D 820. Cutout version D 820 is a rectangular void in measuring arm version D 801, whose long edge is parallel to the long edges of the rectangular that comprises measuring arm version D 801. Fence version D 825 is a raised bar or plane with a straight edge that extends across the width of measuring arm version D 801 perpendicular to precision measuring scale A version D 805 and precision measuring scale B version D 810. Fence version D 825 is located on the lower surface of measuring arm version D 801 at the determinate point that precision measuring scale A version D 805 and precision measuring scale B version D 810 are calibrated to originate from. Fence version D 825 is the point for the beginning of the measurement. The edge of stock to be measured is braced firmly against fence version D 825 under measuring arm version D 801. The stock being measured can be viewed under measuring arm version D 801 through cutout version D 820. Precision measuring scale A version D 805 and precision measuring scale B version D 810 run either side of cutout version D 820, and indicate the length appropriate to the desired finished interior dimensions of the proposed enclosed shape made from a material of the thickness and width that measuring arm version D 801 is calibrated to. By using both sides of cutout version D 820 two marks scribed on stock to be measured in line with both precision measuring scale A version D 805 and precision measuring scale B version D 810. These two marks can be used to orientate a flat edge perpendicular to the axis of measurement in order to scribe a precise line on the stock at the appropriate length to ensure extremely precise measurements. Moreover using two marks made using precision measuring scale A version D 805 and precision measuring scale B version D 810 allows a flat edge to be oriented perpendicular to the axis of measurement whether or not the long edge of the stock to be measured is perfectly square.

Figure 9:
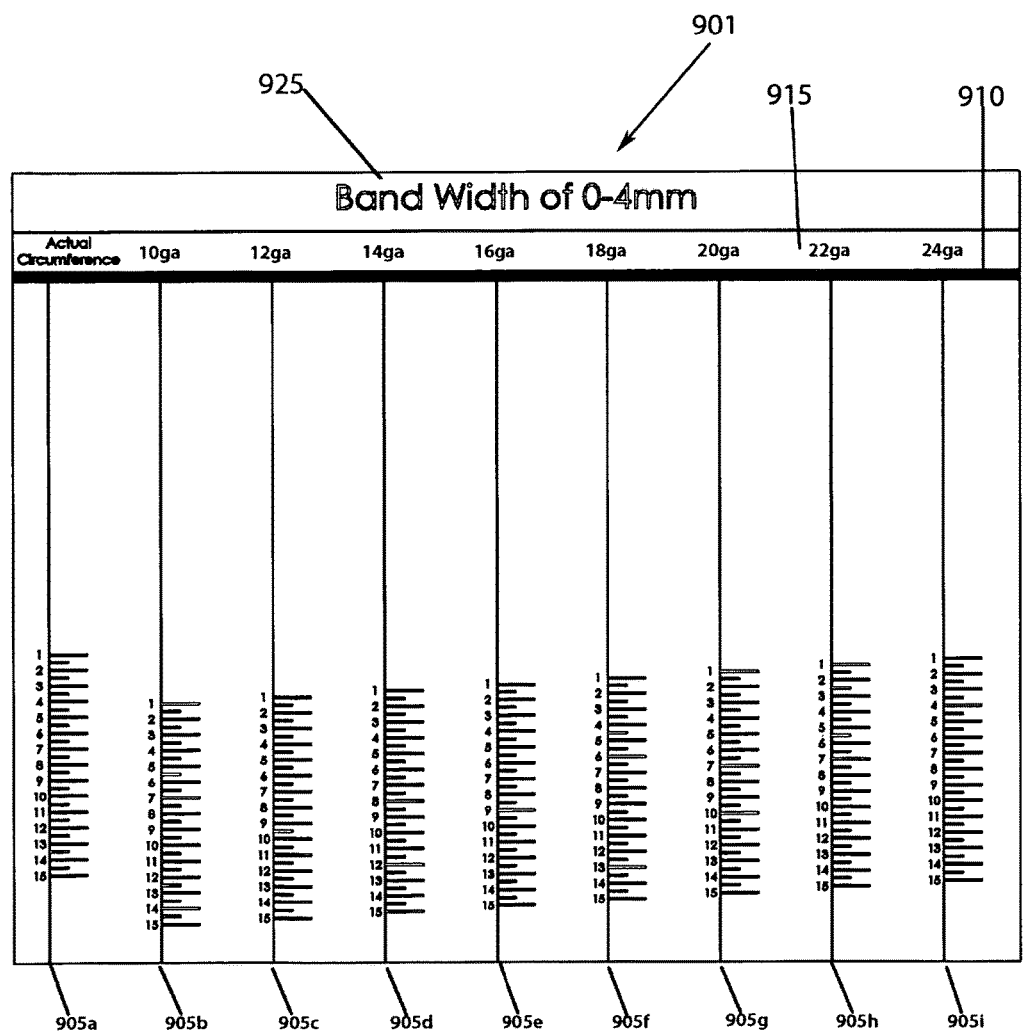
FIG. 9 depicts another embodiment of a tool for determining the length of stock of a given thickness or gauge and width required to form an enclosed shape, ring or tube of a specified internal diameter and/or fit.

FIG. 9 depicts a further embodiment of enclosed shape measuring tool for determining the length of stock of a given thickness or gauge and width required to form an enclosed shape, ring or tube of a specified internal diameter and/or fit enclosed shape measuring tool version E 901. Enclosed shape measuring tool version E 901 is comprised of a single flat sheet of rigid material. Fence version E 910 is a raised plane or narrow rectangular raised bar that is attached to the surface of enclosed shape measuring tool version E 901 adjacent and perpendicular to a series of clearly marked precision measuring scale version E 905*a-i*. Precision measuring scales version E 905*a-i* are arranged in parallel across the width of enclosed shape measuring tool version E 901.

On or above fence version E 910 are gauge marks version E 915, which indicate the gauge for which each precision measuring scale version E 905*a-i* is calibrated. Width mark version E 925 indicates the width of stock for which the precision measuring scales 905*a-i* is calibrated. Each precision measuring scale version E 905*a-i* incorporate size markings that indicate the length of stock or material required to form an enclosed shape of the desired internal dimensions for the indicated length and width. Fence version E 910 is the point for the beginning of the measurement, and allows the user to brace the stock of the appropriate gauge or thickness against fence version E 910 while measuring to enhance the precision and accuracy of the measurement.

Figure 10:
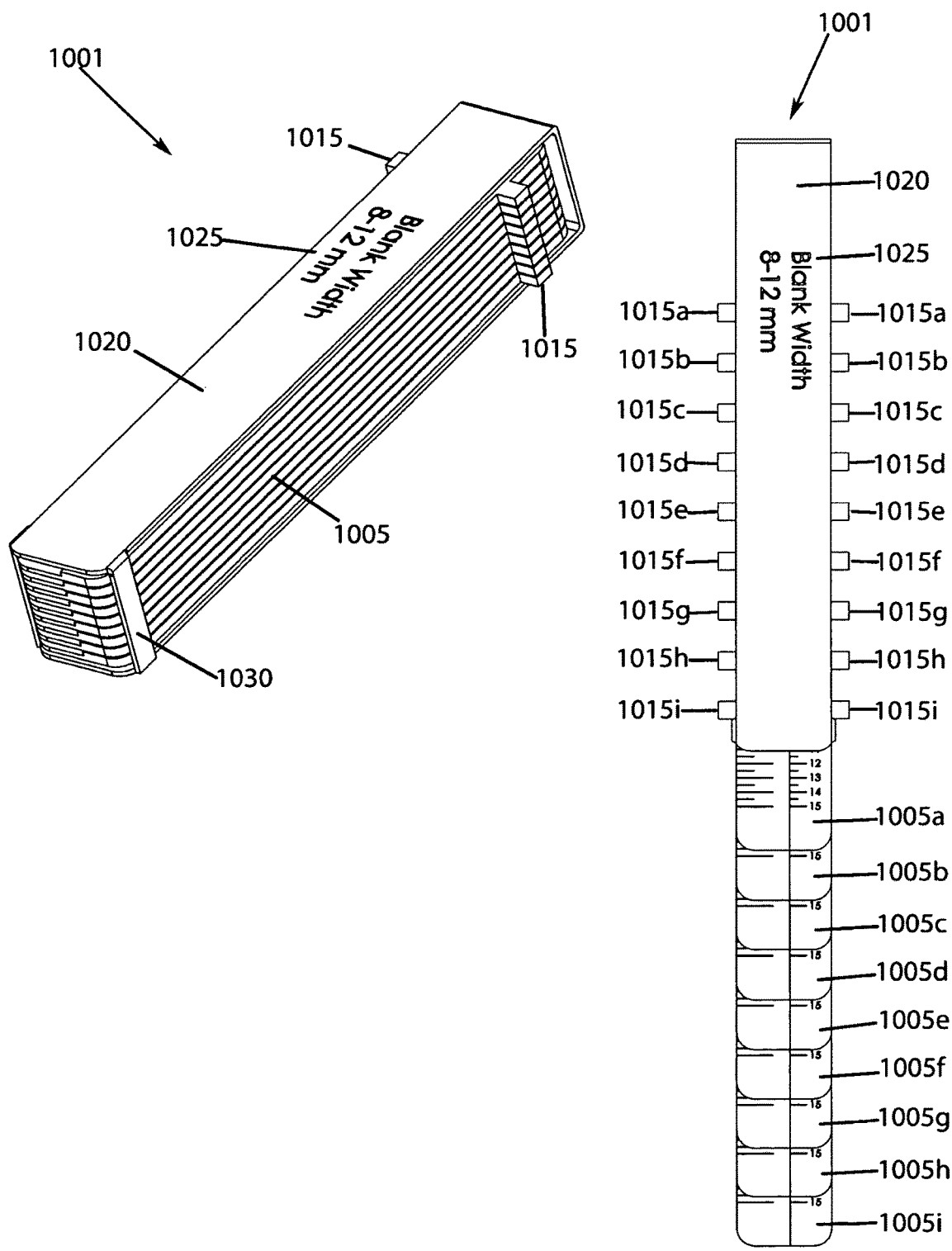
FIG. 10 depicts another embodiment of a tool for determining the length of stock of a given thickness or gauge and width required to form an enclosed shape, ring or tube of a specified internal diameter and/or fit.

FIG. 10 depicts another embodiment of an enclosed shape measuring tool for determining the length of stock of a given thickness or gauge and width required to form an enclosed shape, ring or tube of a specified internal diameter and/or fit enclosed shape measuring tool version F 1001. The measuring elements of enclosed shape measuring tool version F 1001 are calibrated for a particular range of widths of finished enclosed shapes, and this width range is indicated via width mark 1025, imprinted on enclosure version F 1020. Enclosed shape measuring tool version F 1001 has a plurality of arms version F 1005*a-h* that slide out from the open end of enclosure version F 1020. The arms version F 1005*a-h* are comprised of various embodiments of elements of enclosed shape measuring tool 101 such as length measuring arms version A 105, gauge measuring arm version A 110 and ruler version A 125 amongst other possible combinations and elements. Enclosure version F 1020 is a rectangular box with one open end. The plurality of arms that comprise enclosed shape measuring tool version F 1001 such as arms version F 1005*a-h*, slide linearly in and out the open end of enclosure version F 1020, singly and in groups, while remained attached to enclosure version F 1020. Enclosure version F 1020 surrounds all measuring edges of all arms version F 1005*a-h*. Enclosure version F 1020 has stopping bar 1030 located at the end of the long side of enclosure version F 1020 adjacent to the open end of the enclosure and joining the top to the bottom. Each arm version F 1005*a-h* has a pair of tabs 1015 located at the end of each arm version F 1005*a-h* that remains attached to enclosure version F 1020. The open end of enclosure version F 1020 allows the majority of each arm version F 1005*a-h* to extend out of the enclosure. Tabs 1015 prevent arms version F 1005*a-h* from detaching from enclosure version F 1020 by abutting the interior edge of stopping bar 1030 when the arms are fully extended. Thus arms version F 1005*a-h* slide in and out of enclosure version F 1020 without becoming detached from the enclosure. Enclosed shape measuring tool version F 1001 contains a plurality of measuring elements as embodied in enclosed shape measuring tool version A 101, and is used in the same manner, however the elements are arranged in a linear manner that slide in and out along a linear plane rather than being arranged on a rotational axis forming a fan shape when extended.

Figure 11:
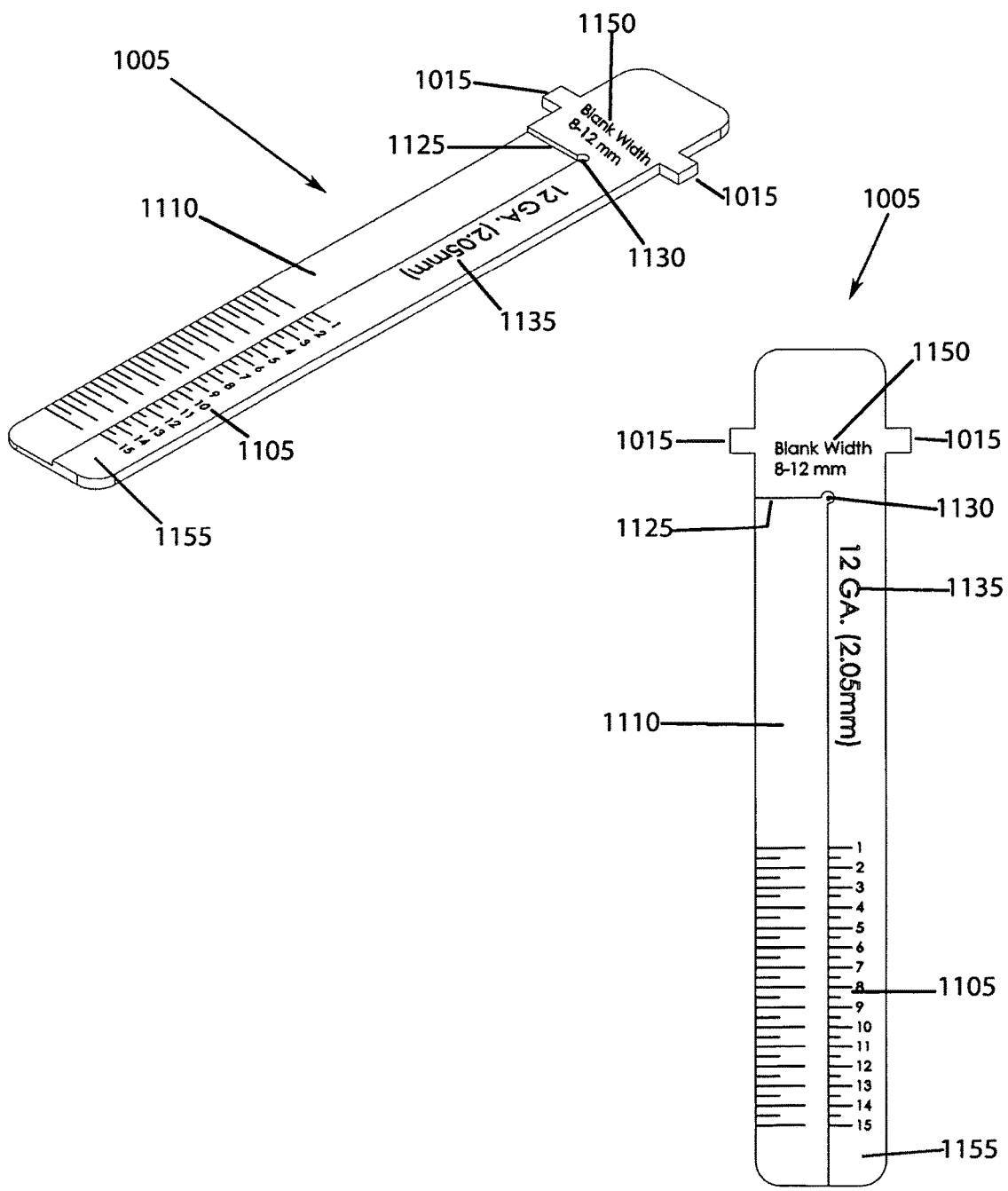
FIG. 11 depicts another embodiment of a measuring arm of a tool for determining the length of stock of a given thickness or gauge and width required to form an enclosed shape, ring or tube of a specified internal diameter and/or fit that determines required length of stock for the given gauge and width of stock.

FIG. 11 depicts an embodiment of length measuring arm version F 1005. Each length measuring arm version F 1005 is calibrated to match a specific range of thicknesses or gauges of stock, and a specific range of widths of stock. Gauge mark version F 1135 indicates the thickness (or range of thicknesses) of stock that length measuring arm version F 1005 is calibrated for. Width mark version F 1150 indicates the range of finished widths that length measuring arm version F 1005 is calibrated for. Precision measuring scale version F 1105 is a clearly marked scale imprinted, engraved, printed or otherwise indicated on length measuring arm version F 1005. Rectangular recess version F 1110 is a flat bed of lower height than the rest of length measuring arm version F 1005. Rectangular recess version F 1110 runs parallel to the long edge of measuring arm version F 1005. Size markings version F 1145 are adjacent to precision measuring scale version F 1105 and are imprinted on length measuring arm version F 1005 to indicate the precise size that will be achieved by forming an enclosed shape using stock of a given length. The border of the long edge of rectangular recess version F 1110 is measuring ledge version F 1155. Measuring ledge version F 1155 is a precisely machined straight line that forms the border between rectangular recess version F 1110 and the raised portion of length measuring arm version F 1005. Apse version F 1130 is a semi-circular recess at the interior junction of the short edge and long edge of rectangular recess version F 1110. Fence version F 1125 is a precisely machined straight line that forms the short edge at the border between rectangular recess version F 1110 and raised portions of length measuring arm version F 1005, that is located at the determinate point that precision measuring scale version F 1105 is calibrate to originate from. Each arm version F 1005*a-h* has a pair of tabs 1015 located at the end of each arm version F 1005*a-h* to prevent them from being uncoupled from enclosure version F 1020 during use.

A further embodiment of length measuring arms version A 105*a-h* is where each measuring arm is itself the same thickness as a the gauge or thickness of stock that the given measuring arm is calibrated to. For instance, a measuring arm version A 105 *a-h* calibrated to stock that is 12 gauge according to the Brown & Sharp Metal Gauge scale which is a thickness of 2.053 mm, would itself be 2.053 mm thick. This innovation would allow the measuring arm to be used as a feeler gauge. In instances where a fabricator is altering the thickness of stock using a rolling mill, this would allow the fabricator to measure the gap in the rolling mill using the appropriate measuring arm. The appropriate measuring arm would be inserted into the gap between the rollers in the rolling mill, and the gap would be adjusted to match the thickness of the appropriate measuring arm. This is a novel combination of length-measuring arms 105 *a-h* and attributes of a feeler gauge.

One way of making various versions and elements of an enclosed shape measuring tool such as enclosed shape measuring tool version A 101, enclosed shape measuring tool version E 901 or other embodiments, is by using a rigid material that will hold crisp edges such as machined and hardened tool steel. In this embodiment length measuring arms version A 105*a-h* are made by laminating two layers of metal, one base layer, and an upper layer which has rectangular recess version A 210, and apse version A 225 cut out of it. Precision measuring scale version A 205 is marked on the upper layer, using engraved, raised, printed or some other form of permanent marking. Enclosure version A 120 is a rigid rectangular surround for the elements of enclosed shape measuring tool version A 101 that protects the measuring edges, and makes the tool easy to grasp. Enclosure version A 120 can be made of metal (with or without texture), plastic, resin, silicone or some other material capable of offering protection for the measuring edges enclosed shape measuring tool version A 101. Enclosed shape measuring tool version A101 has a plurality of arms, blades, or leaves length measuring arms version A 105*a-h*, gauge measuring arm version A 110, ruler version A 125, sliding millimeter gauge arm version A 130 that fan out from a pivot joint version A 115. These arms are secured to enclosure version A 120 at pivot joint version A 115 using a rigid pin, nut and bolt, wing nut and bolt or other means allowing the arms to freely swivel into and out of enclosure version A 120. Enclosure version A 120 covers the measuring edges of all length measuring arms version A 105a-h, gauge measuring arm version A 110, ruler version A 125, and sliding millimeter gauge arm version A 130. Thickness or gauge measuring arm version A 110 can be made by cutting the main shape of gauge measuring arm version A 110 from hardened tool steel, and then precisely machining cutouts version A 515 along any or all edges. Each cutout version A 515 is clearly marked with the precise gauge or thickness of stock that the cutout size corresponds to by using engraved, raised, printed or some other form of permanent marking. Ruler arm version A 125 is cut from hardened tool steel and marked with a fine-grained measuring scale using engraved, raised, printed or some other form of permanent marking. The same procedures could be used to make versions B, C, D, E, and F of an enclosed shape measuring tool and its various elements.

Another way of making various versions and elements of an enclosed shape measuring tool such as enclosed shape measuring tool version A 101, enclosed shape measuring tool version E 901 etc., is by using an alternative rigid or semi-rigid material such as delrin, polypropylene, plastic, etc., to cut the elements from, or alternatively to cast or injection mold the elements from. Elements of an embodiment of enclosed shape measuring tool manufactured of these materials would then be arranged in the same way as elements of other embodiments of enclosed shape measuring tool manufactured from other materials. The same procedures could be used to make versions B, C, D, E, and F of an enclosed shape measuring tool and its various elements.

Further embodiments of the various versions of enclosed shape measuring tool version A 101 make the measuring elements of these embodiments out of a semi-rigid or flexible material. A semi-rigid or flexible material would allow the measuring scales to conform to, and hence accurately measure, materials that are not flat. For instance thick low-domed wire commonly employed to make ring shanks can both be curved as a result of the fabrication process, and difficult to flatten without marring the surface. A flexible embodiment of an enclosed shape measuring tool would allow for the precise measurement of a variety of non-flat surfaces.

Operation

One embodiment of enclosed shape measuring tool version A 101 illustrated in FIG. 1 functions by including tool elements for determining all dimensions required for forming an enclosed shape, ring or tube of a specified internal diameter from stock of various shapes such as flat, round, triangular, square, domed etc. of a particular thickness. The variables required to determine the correct dimension are thickness of material, width of material, length of material, and the ratio of these three variables to a specified internal diameter. Enclosed shape measuring tool version A 101 has a number of arms, blades, or leaves length measuring arms version A 105a-h, gauge measuring arm version A 110, ruler version A 125, sliding millimeter gauge arm version A 130 that fan out from a pivot joint version A 115, each of which measures one or more of the required variables. The first step is to determine the intended width of the finished enclosed shape. Each instance of enclosed shape measuring tool version A 101, or subset thereof, is clearly marked via width mark version A 135 with the range of widths that this instance of the tool is calibrated for. The instance or subset of the tool appropriate for the intended finished width of the enclosed shape should be selected. Then it is necessary to determine the thickness or gauge of the material. If the material is a standard stock thickness according to a scale such as the Brown & Sharp Metal Gauge measures or American Standard Gauge, then the thickness of the material can be determined using gauge measuring arm version A 110. The thickness of the stock is measured by sliding the stock into the precisely machined cutouts 515 on gauge measuring arm version A 110, each of which corresponds to a specific thickness or gauge of stock, until the user finds the cutout 515 that the stock slides snuggly into. Each cutout on gauge measuring arm version A 110 is clearly marked with the precise gauge or thickness of stock that the cutout size corresponds to. If the stock is not a standard thickness, due to being rolled, formed or deformed in some manner, then the thickness of the stock can be measured using sliding millimeter gauge arm version A 130. Each length measuring arm version A 105a-h is designated with a specific gauge or thickness, and marked with precision measuring scale version A 205 that indicates finished internal diameter or size calibrated to the specified gauge of stock and finished width of formed item. Using the width and thickness measurements previously made, one of the length measuring arms version A 105a-h that corresponds to the previously determined range of width and thickness measurements is chosen. The stock to be measured often has deformations or imperfections at the corners, which prevent accurate measurements of its length or width being taken. Apse version A 225 is a semi-circular recess at the interior junction of the short edge and long edge of rectangular recess version A 210 accommodates corner deformations or imperfections on the stock so that extremely accurate length measurements can be taken using length measuring arms version A 105a-h, as these deformations or imperfections are prevented from interfering with aligning the edge of the stock to be measured with the beginning of the measuring scale. If such accommodations for corner deformations are not made, then the true edge of the stock can be pushed away from the end of the scale, compromising the length measurement. The stock is then slid into rectangular recess version A 210, with its long edge held snuggly against the short side of rectangular recess version A 210. A mark is made on the material at the point on precision measuring scale version A 205 that corresponds to the desired internal dimensions of the enclosed shape that will be formed from the given piece of stock. Such accuracy in measurement saves significant time in the fabrication of enclosed shapes by eliminating determining the length of stock required to form an enclosed shape of the desired internal dimensions through mathematical calculations, charts, and post hoc measurement, and revisions of finished shapes to achieve desired internal dimensions.

Conclusions, Ramifications and Scope

Further embodiments of an enclosed shape measuring tool could be based on ratios between length, thickness and width of material and the interior dimensions of other enclosed shapes. Any enclosed shape that is formed from stock on an elongated tubular or tapered form such as a mandrel, that preserves a given shape in cross-section throughout its length, is a candidate. For instance a ratio table such as ratio table 301 could be calculated for forming squares, rectangles, ovals, octagons, triangles, heart-shapes etc., with specific internal dimensions from stock of a given gauge or thickness of material, and used as the basis for an embodiment of enclosed shape measuring tool version A 101. A user would measure the stock using the appropriate instance of an enclosed shape measuring tool, and connect the material into a rough round or an approximation of the intended enclosed shape. This transitional shape would then be placed over the appropriate mandrel, and compressed onto the mandrel at the widest point that it fits to acquire its final shape, whose interior dimensions were determined by the length of the stock so formed. These various shapes formed precisely in metals or other appropriate materials would be extremely useful for creating bezels for a variety of shapes of precious stones, semi-precious stones, and other materials amongst other applications.

In another embodiment of enclosed shape measuring tool version A 101, there are multiple versions of enclosed shape measuring tool version A 101, each of which embodies the measurement ratios for a given range of width of material. Individual length measuring arms version A 105a-h could be provided alone or in combinations of subsets of gauges and widths to those who form rings or tubes only using a small range of widths and thickness of stock.

Considering some salient problems that an enclosed shape measuring tool as proposed here resolves highlights the overall advantages of such an enclosed shape measuring tool. In short the problem is that there are in fact three variables that determine the internal diameter and particular fit of an enclosed shape such as a ring. These variables are: (1) the length of the stock; (2) the thickness (gauge) of the stock; and (3) the width of the proposed enclosed shape. If the finished enclosed shape is required to fit around a form with irregular dimensions such as a finder or precious stone, it much be noted that a wider enclosed shape, which covers more of the finger, will fit differently to a narrow ring, which is only concerned with the diameter of the finger at a specific point. Consequently, a wide ring and a narrow ring of the same size will require different lengths of stock of the same gauge to form, the same holds true for wide and narrow stones and other instances. This variability is not taken into account with the current methods of providing length to gauge (thickness) ratios, however it is a foundational part of the ratios that inform the measuring elements of enclosed shape measuring tool versions A-E. A further inconvenience is generated by the fact that most metal smiths work in multiple thicknesses (gauges) of metal, where differences in the thickness of the stock is so small as to be difficult to perceive by eye, but still significantly affects the internal diameter of the finished enclosed shape. However the inclusion of other measuring members such as thickness or gauge measuring elements resolves this issue, preventing mistaking one gauge of metal for another can further complicate the fabrication process. Also, by including all of these measuring elements in a single package ease of use is maximized.

Such a physical tool as enclosed shape measuring tool versions A-E that provides a tangible, fast, accurate, and easy to use way to determine and measure the length of stock required for a particular ring size and fit in a given width represents a significant time and resource saver for fabricators. The amount of time and resources saved by fabricating rings of an accurate internal diameter and size for a given ring width the first time is significant, and is a valuable benefit for metal smiths, both beginner and advanced. Such a tool can additionally include various other convenient pre-existing measuring elements in a new combination such as a way to accurately measure the gauge or thickness of the metal, contributing to the accuracy and efficiency of the work of metal smiths, jewelers and others who must fabricate enclosed shapes, rings or tubes from various thickness or gauges of metal to exacting specifications. Note that these advantages are not limited to jewelers, but extend to any fabricator seeking to form precise enclosed shapes from stock accurately, and without unnecessary revision, such as mechanical engineers, automotive mechanics or customizers, model makers, and so on.

I claim:

1. A measuring tool for measuring a required length of stock material necessary to form an enclosed shaped having a predetermined internal dimension, the measuring tool comprising:
    a plurality of length measuring arms, each formed of rigid or semi-rigid planar material and each having a surface, a long dimension, a short dimension, and a thickness; and
    wherein each gauge measuring arm comprises:
        indicia imprinted on said surface where said indicia is used for measuring a length of stock material and indicate a ratio between the required length of the stock material and the predetermined internal dimensions of formed enclosed shapes for a predetermined thickness and range of widths of the stock material, and
        a determinate point indicated on said surface where measurements taken using said indicia are calibrated to originate.

2. The measuring tool of claim 1, wherein said indicia imprinted on said surface are parallel to a long dimension of a rectangular recess positioned at a first corner at an intersection of two edges of said surface extending at least a length of said indicia and having an apse at a second corner of said rectangular recess diagonally opposite said first corner.

3. The measuring tool of claim 1, wherein said surface comprises a fence perpendicular to said indicia at the point of said length measuring arm where measurements taken using said indicia are calibrated to originate from.

4. The measuring tool of claim 1, wherein for each of the plurality of length measuring arms, the thickness of the measuring arm equals a predetermined thickness of stock material for which the ratio of the indicia is based.

5. The measuring tool of claim 1, further comprising a gauge measuring arm formed of a sheet or rigid or semi-rigid material and formed with a plurality of cutouts along an edge where each of said cutouts corresponds to a specific thickness of possible stock material.

6. The measuring tool of claim 1, wherein each of the plurality of length measuring arms is formed with a pivot joint aperture and wherein the measuring tool further comprises a pivot joint configured to couple to each pivot joint aperture.

7. The measuring tool of claim 1, further comprising a enclosure sized and configured to receive the plurality of length measuring arms, and wherein each of the length measuring arms is moveably coupled to the enclosure.

8. A measuring tool comprising a plurality of members wherein:
    all or some of said members are measuring members formed of rigid or semi-rigid planar material each having a surface;
    indicia imprinted on said surface where said indicia is used for measuring a length of stock material and indicate a ratio between length and internal dimensions of formed enclosed shapes for a predetermined thickness and range of widths of material;
    a determinate point indicated on said surface where measurements taken using said indicia are calibrated to originate;

whereby dimensions of material of a predetermined thickness and range of widths necessary to form enclosed shapes with predetermined dimensions can be measured; and wherein said indicia imprinted on said surface are parallel to a rectangular recess positioned at an intersection of two edges of said surface extending at least a length of said indicia, and wherein said rectangular recess is formed with an apse at corner of said rectangular recess diagonally opposite said two edges of said surface where the shorter edge of said rectangular recess is located at the point of said measuring member where measurements taken using said indicia are calibrated to originate from.

9. A measuring tool for measuring a length of stock material, which has a thickness and width, required in order to produce an enclosed shape having a desired inside diameter, the measuring tool comprising:

a plurality of length measuring arms;

at least one gauge measuring arm having a long dimension and a short dimension, an edge along the long dimension formed with a plurality of cutouts of various sizes, wherein each cutout is labeled with a corresponding gauge of an item that fits within the cutout;

an enclosure sized and configured to receive the plurality of length measuring arms and the at least one gauge measuring arm, the plurality of length measuring arms and the at least one gauge measuring arm moveably coupled to the enclosure; and wherein each of the plurality of length measuring arms comprises:

first indicia indicative of a range of widths for the stock material for which the length measuring arm is suitable, second indicia indicative of a thickness of the stock material for which the length measuring arm is suitable, third indicia indicative of the required length of stock material for the desired inside diameter, and a fence formed on a portion of the length measuring arm, the fence defining a datum from which measurements are made with respect to the third indicia.

10. The measuring tool of claim 9, wherein the plurality of length measuring arms and the at least one gauge measuring arm moveably coupled to the enclosure by a pivot joint.

11. The measuring tool of claim 9, wherein the plurality of length measuring arms and the at least one gauge measuring arm are moveably coupled to the enclosure by a plurality of tabs formed on each length measuring arm and formed on the at least one gauge measuring arm and at last one stopping bar coupled to the enclosure.

12. The measuring tool of claim 9, further comprising a rectangular recess for receiving the stock material to be measured and wherein the fence is formed by one wall of the rectangular recess.

13. The measuring tool of claim 12, wherein an internal corner of the rectangular recess is formed with an apse.

14. The measuring tool of claim 9, wherein the fence comprises a raised portion extending across at least a portion of the short dimension of the length measuring arm.

15. The measuring tool of claim 9, wherein the fence comprises a wall of a closed cutout on the length measuring arm.

16. The measuring tool of claim 9, wherein the enclosure is formed with a grip recess exposing a portion of at least one of the plurality of length measuring arms or the at least one gauge measuring arm.

* * * * *